Aug. 11, 1925.  S. MASTERS  1,549,042
GARDEN TOOL
Filed June 27, 1924
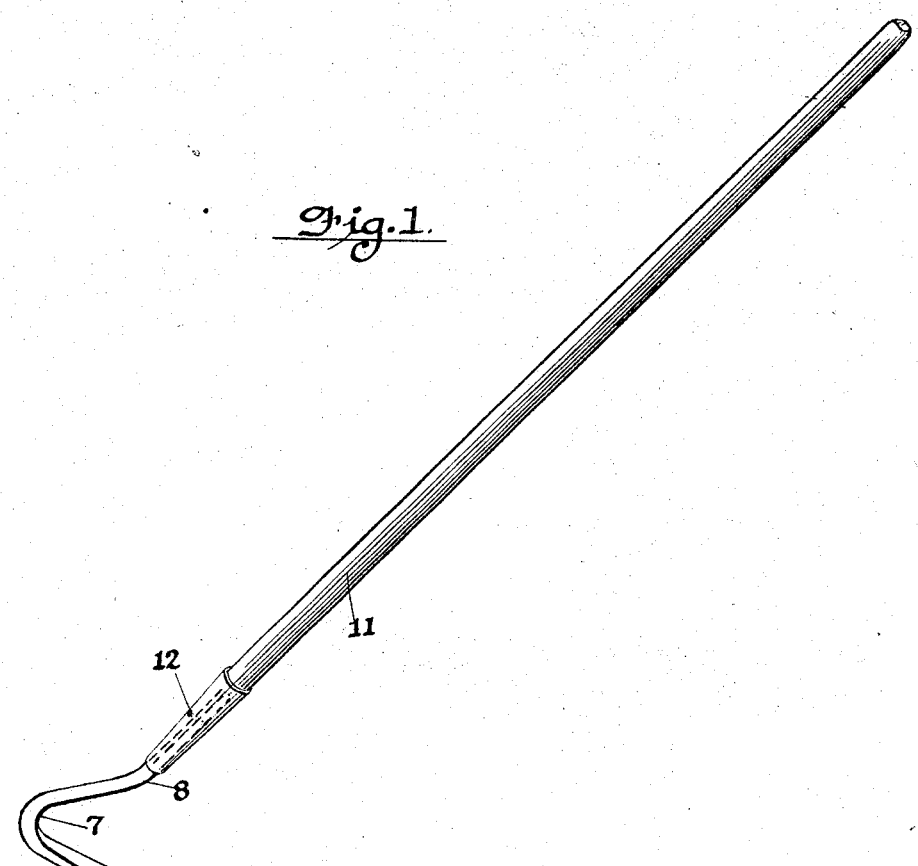
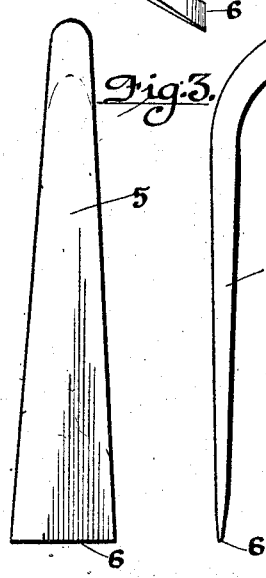
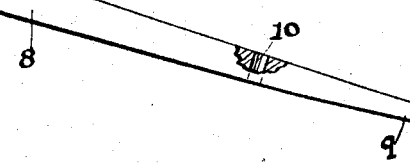
Inventor.
Silas Masters Patented Aug. 11, 1925.

1,549,042

UNITED STATES PATENT OFFICE.

SILAS MASTERS, OF LONG BEACH, CALIFORNIA.

GARDEN TOOL.

Application filed June 27, 1924. Serial No. 722,687.

*To all whom it may concern:*

Be it known that I, SILAS MASTERS, a citizen of the United States, residing at Long Beach, in the county of Los Angeles and State of California, have invented new and useful Improvements in Garden Tools, of which the following is a specification.

My present invention relates to an improved garden implement for working, cultivating or pulverizing the soil.

An object of this invention is the provision of a light and effective garden implement capable of penetrating hard soil with ease.

Another object of this invention is the provision of a garden tool capable of readily eliminating weeds from the soil.

With the foregoing objects in view, together with such other objects and advantages as may subsequently appear, this invention consists in the construction and arrangement of parts hereinafter described and claimed and illustrated in the accompanying drawings, in which:

Figure 1 is a perspective view of my improved garden tool,

Fig. 2 is a side elevation of the tool without the handle, and

Fig. 3 is an end view of Fig. 1.

Referring to the drawings for a more detailed description thereof, the device of my invention comprises a narrow flat blade 5 having a sharpened lower edge 6. The sides of the blade converge upwardly as best shown in Fig. 3. The upper end of the blade 5 is bent backwards arcuately at 7, the radius of the arc being long enough to provide a space of such area that soil or weeds will not be held by the tool.

The device also comprises a shank 8 which is preferably square and tapers towards the end 9. An aperture 10 is provided in the shank 8 which is fitted into a handle 11 and secured by a pin 12.

This invention has been described, but modifications thereof may be devised without departing from the spirit thereof, and it is to be understood that such modifications come within the scope of this invention.

What is claimed is:

A garden implement comprising an elongated tapered shank, an elongated blade substantially triangular shaped in front elevation, tapered in side elevation and terminating at its base in a bevelled cutting edge, and a curved neck connecting said blade and shank.

In testimony whereof I have signed my name to this specification.

SILAS MASTERS.